United States Patent
Enokido et al.

(10) Patent No.: US 9,607,743 B2
(45) Date of Patent: Mar. 28, 2017

(54) R-T-B BASED SINTERED MAGNET

(71) Applicant: TDK CORPORATION, Tokyo (JP)

(72) Inventors: Yasushi Enokido, Tokyo (JP); Kyung-Ku Choi, Tokyo (JP); Kenichi Suzuki, Tokyo (JP); Daisuke Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 238 days.

(21) Appl. No.: 14/258,645

(22) Filed: Apr. 22, 2014

(65) Prior Publication Data

US 2014/0311291 A1 Oct. 23, 2014

(30) Foreign Application Priority Data

Apr. 22, 2013 (JP) .................... 2013-089521

(51) Int. Cl.

| | | |
|---|---|---|
| *H01F 1/053* | (2006.01) | |
| *H01F 1/057* | (2006.01) | |
| *B22F 1/00* | (2006.01) | |
| *B32B 15/01* | (2006.01) | |
| *C22C 38/00* | (2006.01) | |
| *C22C 38/06* | (2006.01) | |
| *C22C 38/10* | (2006.01) | |
| *C22C 38/16* | (2006.01) | |
| *C22C 33/02* | (2006.01) | |

(52) U.S. Cl.
CPC .............. *H01F 1/0536* (2013.01); *B22F 1/00* (2013.01); *B32B 15/015* (2013.01); *C22C 33/0278* (2013.01); *C22C 38/002* (2013.01); *C22C 38/005* (2013.01); *C22C 38/06* (2013.01); *C22C 38/10* (2013.01); *C22C 38/16* (2013.01); *H01F 1/0577* (2013.01); *B22F 2998/10* (2013.01); *B22F 2999/00* (2013.01); *C22C 2202/02* (2013.01)

(58) Field of Classification Search
CPC ...................................................... H01F 1/0536
See application file for complete search history.

(56) References Cited

U.S. PATENT DOCUMENTS

| | | | |
|---|---|---|---|
| 4,908,076 A | 3/1990 | Iijima et al. | |
| 2009/0019969 A1* | 1/2009 | Kato | C22C 33/0278 75/228 |
| 2011/0262297 A1* | 10/2011 | Ishii | B22F 1/0014 419/23 |
| 2013/0009503 A1* | 1/2013 | Iwasaki | C21D 6/00 310/152 |
| 2013/0009736 A1 | 1/2013 | Honkura et al. | |

FOREIGN PATENT DOCUMENTS

| | | | |
|---|---|---|---|
| JP | S60-228652 A | 11/1985 | |
| JP | B2-6-942 | 1/1994 | |
| JP | B2-6-2930 | 1/1994 | |
| JP | B2-6-6776 | 1/1994 | |
| JP | 2002-190404 A | 7/2002 | |
| JP | 2010-045068 A | 2/2010 | |
| JP | WO 2011122638 A1 * | 10/2011 | ............. C21D 6/00 |

* cited by examiner

*Primary Examiner* — Jessee Roe
*Assistant Examiner* — Christopher Kessler
(74) *Attorney, Agent, or Firm* — Oliff PLC

(57) ABSTRACT

The present invention provides a permanent magnet with excellent adhesion strength with plated layer and without significant decrease in magnetic properties, compared to the conventional R-T-B based magnet. By means that the R-T-B based magnet as the raw material is applied to heating treatment for a long time, the major phase grains will form core-shell like structures in the R-T-B based magnet in which R1 and Ce are included as an essential of R. When the mass concentration of R1 and Ce in the core portion is set as $\alpha R1$ and $\alpha Ce$ respectively and that of R1 and Ce in the shell portion is set as $\beta R1$ and $\beta Ce$ respectively, the ratio (B/A) between the mass concentration ratio of R1 to Ce in the shell portion ($\beta R1/\beta Ce=B$) and that of R1 to Ce in the core portion ($\alpha R1/\alpha Ce=A$) is 1.1 or more.

5 Claims, No Drawings

R-T-B BASED SINTERED MAGNET

The present invention relates to a rare earth based permanent magnet, especially a rare earth based permanent magnet obtained by selectively replacing part of the R in the R-T-B based permanent magnet with Ce.

BACKGROUND

The R-T-B based magnet (R is a rare earth element, T is Fe or Fe with part of it replaced by Co, and B is boron) comprising a tetragonal compound $R_2T_{14}B$ as the major phase is known to have excellent magnetic properties, and has been considered as a representative permanent magnet with good performances since it was invented in 1982 (See Japanese Laid-Open Patent Publication No. Sho 59-46008).

In particular, the R-T-B based magnets in which the rare earth element R consists of Nd, Pr, Dy, Ho or Tb have large magnetic anisotropy fields Ha, and have been widely used as permanent magnet materials. Of those, the Nd—Fe—B based magnet having Nd as the rare earth element R is widely used in people's livelihood, industries, transportation equipment and the like, because it has a good balance among saturation magnetization Is, Curie temperature Tc and magnetic anisotropy field Ha. However, in recent years, since the uses of the R—Fe—B based magnet are expanding and the consumption amount of Nd or Pr or the like is dramatically increasing, it is strongly required that the efficient utilization of Nd or Pr or the like as the valuable resources is achieved and the material costs of the R—Fe—B based magnet are controlled low.

On the other hand, as the R-T-B based magnet comprises a rare earth element which is easily oxidized and an iron as the main component, its corrosion resistance is relatively low, thus its magnetic properties would deteriorate due to oxidization. Therefore, the forming of various protection films on the surface of the magnet body is performed. If the adhesion strength between the magnet body and the protection film is low, the protection film would peel off according to the conditions during using, causing corrosion of the magnet body. Therefore, the adhesion strength between the magnet body and the protection film is required to improve. The adhesion strength between the magnet body and the protection film is due to both physical and chemical binding force, but it depends on the chemical properties of the magnet body and the protection film essentially. That is, adhesion property is influenced by the composition of magnets.

PATENT DOCUMENTS

Patent Document 1: Japanese Patent Publication No. Hei 6-6776
Patent Document 2: Japanese Patent Publication No. Hei 6-942
Patent Document 3: Japanese Patent Publication No. Hei 6-2930

Ce is known as a rare earth element R showing high coercivity with rich resources. Patent Document 1 relates to a sintered magnet and a resin-bonded magnet with low cost and high performances. That is, such a magnet has a composition of Ce—La-(didymium; an Nd—Pd alloy)-Fe added by the semimetal(s) and is represented by the formula of $Ce_{1-x-y-z}Pr_xNd_yLa_z(Fe_{1-m}M_m)_n$ in the form of atomic ratios, wherein M consists of one or two or more elements selected from the group consisting of B, C, Si, Ge, P and S, the x, y, z, t, m and n fall within the ranges of $0.1 \leq x \leq 0.5$, $0.1 \leq y \leq 0.85$, $0 \leq z \leq 0.1$, $0.02 \leq m \leq 0.1$, $0 \leq n \leq 8.0$ and $0 < 1-x-y-z < 0.8$. Here, La is an essential. In the properties of this kind of magnet, the coercivity is 7.3 kOe or more.

In addition, Patent Document 2 also relates to a sintered magnet and a resin-bonded magnet with a low cost and high performance. It has a composition that Ce—La-(didymium; an Nd—Pd alloy)-Fe—B is substituted with Co, and the coercivity can be 7.9 kOe.

Furthermore, Patent Document 3 also relates to a sintered magnet and a resin-bonded magnet with a low cost and high performance. It has a composition that Ce—La-(didymium; an Nd—Pd alloy)-Fe is substituted with M, and the coercivity can be 7.5 kOe or more.

The coercivity of each of these magnets is much lower than that of the Nd-T-B based magnet which is about 10 kOe. Thus, it is difficult to use them to replace the conventional Nd-T-B based magnets.

SUMMARY

The present invention is achieved by recognizing the above-mentioned situation. It is an object of the present invention to provide a permanent magnet of a R-T-B based magnet in which part of R is selectively replaced by Ce, with the improvement of adhesion strength to a plated layer and coercivity compared to the conventional one.

The R-T-B based permanent magnet of the present invention is a R-T-B based sintered magnet (wherein, R includes Ce and R1 as essential, R1 is at least one rare earth element except Ce, and T is at least one transition metal element including Fe or the combination of Fe and Co as essential), which comprises major phase grains having a core portion and a shell portion that covers the core. When the mass concentration of R1 and Ce in the core portion is set as αR1 and αCe respectively, and the mass concentration of R1 and Ce in the shell portion is set as βR1 and βCe respectively, the mass concentration ratio (βR1/βCe=B) between R1 and Ce in the shell portion is larger than that between R1 and Ce in the core portion (αR1/αCe=A). Here, said B/A is preferably 1.1 or more. With the above structure, the R-T-B based sintered magnet having both high coercivity and high adhesion strength to the plated layer in the R-T-B based sintered magnet can be obtained.

The present invention has Ce and R1 as R, and Ce with abundant resources can be efficiently used. In addition, Ce has the lowest melting point among the rare earth elements and exhibits high wettability to metals. By using Ce, the adhesion strength to plated layer can be improved. Especially, $Ce_3Ni$ and the like can be formed by Ce and Ni, and thus Ce shows high compatibility with Ni. Hence, the adhesion strength to Ni plated layer is high. On the other hand, there exists the problem that anisotropy field would be reduced. Therefore, in view of the great influence of the anisotropy field of crystal grain surface on coercivity of the R-T-B based magnet, the inventors found that high anisotropy field and relatively high coercivity can be achieved by relatively decreasing concentration of Ce in crystal grain surface namely the shell portion compared to that in the core portion. Thus, the present invention has been completed.

In the present invention, in R-T-B based magnet added with Ce, higher coercivity than that of the R-T-B based magnet having Ce as R can be maintained, by mainly distributing Ce in the core and mainly distributing R1 except Ce in the shell. In addition, since the adhesion strength to the plated film can be enhanced compared to the conventional R-T-B based magnets using Nd, Pr, Dy, Ho and Tb as R, the plated film can be hardly peeled off compared to the conventional R-T-B based magnets using Nd, Pr, Dy, Ho and Tb as R.

DETAILED DESCRIPTION OF EMBODIMENTS

The present invention is detailed described based on the embodiments as follows. Further, the present invention is not limited by the following embodiments and examples. In addition, the constituent elements in the following embodiments and examples include those a person skilled in the art can easily conceive of, those substantially the same and those within the equivalent range. Besides, it is possible to appropriately combine and select the constituent elements disclosed in the following embodiments and examples.

The R-T-B based sintered magnet according to the present embodiment contains 11~18 at % of the rare earth element (R). The R in the present invention has Ce and R1 as essential, and R1 is at least one rare earth element except Ce. If the amount of R is less than 11 at %, forming of $R_2T_{14}B$ phase as major phase in the R-T-B based sintered magnet is not sufficient, α-Fe and the like with soft magnetic properties precipitates and coercivity is significantly decreased. On the other hand, if the amount of R is larger than 18 at %, volume ratio of $R_2T_{14}B$ phase as the major phase is decreased, and the residual flux density is reduced. In addition, the R-rich phase which is effective in the forming of coercivity will reduce leading to the decrease of coercivity, in accordance with the fact that R reacts with oxygen and the amount of the contained oxygen increases.

In the present embodiment, the rare earth element (R) contains Ce and R1. R1 is at least one rare earth element except Ce. As R1, it may contain other components such as impurities from the raw materials or impurities mixed in the manufacturing process. Further, if considering achieving high anisotropy field, R1 is preferably Nd, Pr, Dy, Ho and Tb. In addition, from the viewpoints of raw material price and corrosion resistance, R1 is more preferably Nd. The content ratio of R1 and Ce in the rare earth element (R) is preferably 50:50~90:10. As Ce has the lowest melting point among the rare earth elements, it has high wettability. And thus the adhesion strength to the plated layer can be improved by adding Ce. However, if the content of Ce is over 50%, the residual flux density and the coercivity tend to decrease. On the other hand, if the content of Ce is less than 10%, the effect of improving the adhesion strength to the plated layer tends to become smaller.

The R-T-B based sintered magnet according to the present embodiment contains 5~8 at % of boron (B). When the content of B is less than 5 at %, high coercivity cannot be achieved. On the other hand, if the content of B is more than 8 at %, the residual magnetic density tends to decrease. Thus, the upper limit for B is set to 8 at %.

The R-T-B based sintered magnet according to the present embodiment may contain 4.0 at % or less of Co. Co forms the same phase as that of Fe, and has effect on improving Curie temperature and corrosion resistance of grain boundary phases. In addition, the R-T-B based sintered magnet used in the present invention may contain one or two of Al and Cu in the range of 0.01~1.2 at %. By containing one or two of Al and Cu in such a range, high coercivity, high corrosion resistance and the improvement of temperature characteristics of the obtained sintered magnet can be realized.

The R-T-B based sintered magnet according to the present embodiment is allowed to contain other elements. For example, elements such as Zr, Ti, Bi, Sn, Ga, Nb, Ta, Si, V, Ag, Ge and the like may be appropriately contained. On the other hand, impurity elements such as oxygen, nitrogen, carbon and the like are preferably reduced as much as possible. Especially, the content of oxygen that damages the magnetic properties is preferably 5000 ppm or less, more preferably 3000 ppm or less. The reason is that if the content of oxygen is high, the phase of rare earth oxides as the non-magnetic component increases, leading to lowered magnetic properties.

The R-T-B based sintered magnet according to the present embodiment comprises major phase grains having a core portion and a shell portion that covers the core. When the mass concentration of R1 and Ce in the core portion is set as αR1 and αCe respectively and the mass concentration of R1 and Ce in the shell portion is set as βR1 and βCe respectively, the ratio (B/A) between the mass concentration ratio of R1 and Ce in the shell (βR1/βCe=B) and the mass concentration ratio of R1 and Ce in the core portion (αR1/αCe=A) is 1.1 or more. As mentioned above, coercivity of the R-T-B based magnet is greatly influenced by anisotropy field of crystal grain surface. By containing Ce (cerium) and R1 as R, and relatively reducing the concentration of Ce in the crystal grain surface i.e. the shell portion, relatively higher coercivity of the R-T-B based sintered magnet according to the present embodiment compared to the conventional Ce-T-B based magnet is achieved. In view of the above point, B/A is preferable to be 1.4 or more. In addition, R1 is preferably at least one selected from the group consisting of Nd, Pr, Dy, Ho and Tb.

In the R-T-B based sintered magnet according to the present embodiment, the protection film is formed on the surface of the sintered magnet body.

The protection film according to the present embodiment is not particularly limited, but the protection film obtained by electrolytic plating is particularly preferable to use. As the materials in electrolytic plating, any of Ni, Ni—P, Cu, Zn, Cr, Sn and Al can be used, and other materials can also be used. Especially, $Ce_3Ni$ and the like can be formed by Ce and Ni, and thus Ce shows high compatibility with Ni. Hence, as the plated film, Ni is the best. In addition, multilayer may also be formed by these materials to cover the magnet. The protection film obtained by electrolytic plating is a typical embodiment according to the present embodiment, while the protection film obtained by other methods can also be provided. As the protection film obtained by other methods, any of the films obtained by non-electrolytic plating, chemical conversion treatment a representative of which is chromate treatment and resin coating or the combination thereof is useful. It is necessary to vary the thickness of the protection film depending on the size of the rare earth based sintered magnet body, the level of the desired corrosion resistance and the like. The thickness may be appropriately set to the range of 1~100 μm. The thickness of the protection film is preferably 1~50 μm.

The preferable example of manufacturing method in the present invention is described as follows.

During manufacturing of the R-T-B based magnet according to the present embodiment, firstly, the raw material alloys are prepared to obtain the R-T-B based magnet with the desired composition. The alloys can be produced by strip casting method or the other known melting method in the vacuum or in the atmosphere of inert gas, preferably in the atmosphere of Ar. Strip casting method is the one that the raw metal melts in the non-oxidizing atmosphere such as Ar gas and the like, and then the obtained molten solution is sprayed to the surface of the rotating roll. The molten solution quenched by the roll is rapidly-solidified to become a sheet or a flake (squama). The rapidly-solidified alloys have the homogeneous organization with a grain diameter of 1~50 µm. It is not limited to obtain the raw material alloys by strip casting method. The alloys can be obtained by the melting method such as high frequency induction melting method and the like. Further, in order to prevent segregation after melting, the solution may be poured onto a water-cooled copper plate to make it solidify. Besides, the alloys obtained by reduction diffusion method may also be used as the raw materials.

In the case of obtaining the R-T-B based sintered magnet in the present invention, the so-called single-alloy method is basically applied by using one alloy as the raw material to produce sintered magnets. And the so-called mixing method can also be applied by using the alloy (low R alloy) consisting mainly of $R_2T_{14}B$ crystal grains and the alloy (high R alloy) containing more R than that in low R alloy.

The raw alloys are supplied to the pulverization step. When using the mixing method, the low R alloy and the high R alloy are pulverized separately or pulverized together. The pulverization step includes a coarse pulverization step and a fine pulverization step. Firstly, the raw alloys are pulverized until a particle diameter of approximately several hundred µm is obtained. The coarse pulverization is preferably performed by using a stamp mill, a jaw crusher, a braun mill and the like in the atmosphere of an inert gas. Before coarse pulverization, it is effective to have hydrogen absorbed in the raw alloy, and then release the hydrogen in order to perform pulverization. The purpose of hydrogen-releasing treatment is to reduce the hydrogen which is the impurity in the rare earth-based sintered magnet. The maintained heating temperature to absorb hydrogen is set to be 200□ or more, preferably 350□ or more. While the holding time may change depending on the relationship with the holding temperature, the thickness of the raw alloy and the like, it is set to be at least 30 min or more, preferably 1 hour or more. The hydrogen-releasing treatment is performed in vacuum or in the airflow of Ar. Further, hydrogen-absorbing treatment and hydrogen-releasing treatment are not essential treatment. The hydrogen pulverization can also be positioned as the coarse pulverization to omit a mechanical coarse pulverization.

After the coarse pulverization, the fine pulverization is performed. During the fine pulverization, a jet mill is mainly used to pulverize the coarse pulverized powder having a particle diameter of approximately several hundred µms to be a fine pulverized powder with a particle diameter of 2.5~6 µms, preferably 3~5 µms. The jet mill discharges inert gas from a narrow nozzle at high pressure and produces high speed airflow. The coarse pulverized powder is accelerated by the high speed airflow, causing a collision between coarse pulverized powders each other or a collision between coarse pulverized powders and a target or a container wall, and is pulverized.

The wet pulverization may also be applied in the fine pulverization. In the wet pulverization, a ball mill, a wet attritor or the like can be used to pulverize the coarse pulverized powder having a particle diameter of approximately several hundred µms to a fine pulverized powder with a particle diameter of 1.5~5 µm, preferably 2~4.5 µm. In the wet pulverization, since the pulverization can proceed without magnet powders exposed to oxygen by choosing appropriate dispersing medium, the fine powder with low oxygen concentration can be obtained.

During the fine pulverization, a fatty acid or a derivative of the fatty acid or a hydrocarbon, such as zinc stearate, calcium stearate, aluminium stearate, stearic amide, oleic amide, ethylene bis-isostearic amide as stearic acid based compounds or oleic acid based compounds; paraffin, naphthalene as hydrocarbons and the like with the range of about 0.01~0.3 wt % can be added so as to improve the lubrication and orientation in molding.

The fine powder is molded in the magnetic field.

The molding pressure of the molding in the magnetic field may be set in the range of 0.3~3 ton/cm$^2$ (30~300 MPa). The molding pressure may be constant from beginning to end, and may also be increased or decreased gradually, or it may be randomly changed. The lower the molding pressure is, the better the orientation is. However, if the molding pressure is too low, there will be a problem in handling due to insufficient strength of the molded body. From this point, the molding pressure is selected from the above range. The resulting relative density of the obtained molded body obtained in the magnetic field is usually 40~60%.

The magnetic field is applied in the range of about 10~20 kOe (960~1600 kA/m). The applied magnetic field is not limited to a magnetostatic field, and it can also be a pulsed magnetic field. In addition, a magnetostatic field and a pulsed magnetic field can also be used together.

Then, the molded body is sintered in a vacuum or an inert gas atmosphere. A sintering temperature is required to be adjusted according to the conditions such as composition, pulverization method, the difference of average particle diameter and grain size distribution and the like. The molded body is fired at 1000~1200° C. for 8 hours to 50 hours. The reason is that the diffusion of Ce from the shell portion to the core portion will be insufficient, and the structure in which the mass concentration of R1 and Ce in the core portion and the shell portion is controlled can not be obtained, if the sintering time is less than 8 hours, and grain growth will significantly proceed and particularly cause bad effect in coercivity if the sintering time is 50 hours or more.

After sintering, the obtained sintered body may be subjected to aging treatment. The step is an important step to control the coercivity. When the aging treatment is divided into two stages, it is effective to hold for a predetermined time at about 800° C. and about 600□. If the heating treatment is performed at about 800□ after sintering, the coercivity will increase, so it is particularly effective in mixing method. In addition, as coercivity is greatly increased in the heating treatment at about 600□, the aging treatment is preferably performed at 600□ when the aging treatment is performed in one stage.

The embodiments to preferably carry out the present invention are described hereinbefore, the structure of the present invention can be obtained by increasing the ratio of R1 in the shell. In this case, the method of grain boundary diffusion can also be used by attaching the powder containing R1 or forming a layer containing R1 on the surface of the sintered body and heating.

The sintered body after the above treatment is cut into predetermined sizes and shapes. While the processing method for the surface of the sintered body is not particularly limited, machining can be performed. As machining, grinding treatment using grinding stone and the like are included.

Next, the protection film is formed. The forming of the protection film can be performed by the known method according to the species of the protection film. For example, in the case of electroplating, the common method such as degreasing, water washing, etching (for example, nitric acid), water washing, film forming by using electroplating, water washing, drying, can be used. The degreasing and the chemical etching using acids can be performed and the surface of the sintered body is cleansed. As the plating bath used in the electroplating of Ni, Watt bath without nickel chloride (that is, using nickel sulfate and boric acid as the main components), sulfamic acid bath, fluoborate bath, nickel bromide bath and the like are included. However, in this case, in order to decrease the dissolution of the anode, the nickel ion is preferably supplemented to the bath solution. Nickel ion is preferably supplemented in the form of the solution of nickel sulfate or nickel bromide.

EXAMPLES

Hereinafter, the invention will be described in detail using the examples and the comparative examples, however, the present invention is not limited to the following examples.

Example 1

The composition of the raw alloy was 14.9 mol % R-6.43 mol % B-0.57 mol % Co-0.06 mol % Cu-0.44 mol % Al—Fe bal. R was set to be R1: Ce=100:0~10:90 in terms of molar ratio. The metals or alloys as the raw materials were formulated to be the above composition. The raw alloy sheets were melt and casted by strip casting method.

The obtained raw alloy sheets were pulverized by means of hydrogen to obtain coarse pulverized powder. Oleic amide in an amount of 0.1 wt % was added to the coarse pulverized powder as a lubricant. Then, a fine pulverization was performed under high pressure in the atmosphere of nitrogen gas using a jet mill to obtain a fine pulverized powder.

Subsequently, the produced fine pulverized powder was molded in a magnetic field. Specifically, the molding was performed in the magnetic field of 15 kOe under a pressure of 140 MPa, and a molded body with a size of 20 mm×18 mm×13 mm was obtained. The direction of the magnetic field was a direction vertical to the pressing direction. And the obtained molded body was fired at 1030□ for 1 hour to 48 hours. The diffusion of Ce towards grain boundary phase could be further enhanced by increasing the firing time. Next, an aging treatment at 800□ for an hour and at 500□ for an hour was performed to obtain sintered body.

The BH tracer was used to measure the coercivity of the obtained sintered body. The results were shown in Table 1.

Subsequently, electroplating with Ni was performed on each sintered body. The film thickness of the Ni-plated layer is 10 μm. After forming of the Ni-plated layer, the adhesion strength of Ni film i.e., the protection film was measured. The results were shown in Table 1. Further, the adhesion strength was measured by the method described in JIS-H8504.

In addition, the obtained sintered body was buried with an epoxy resin, and its cross-section was grinded. The commercially available abrasive paper was used in grinding. The grind was performed while changing the abrasive paper with low roughness to that with high roughness. Finally, a buff and diamond abrasive grains were used to grind. At this time, the grind was performed without water and the like. The components in the grain boundary phase would be corroded if using water.

The composition distribution of the samples after grinding was studied by using EPMA. The core portion, the shell portion, the triple point and the like in the major phase grains were specified by observing backscattered electron images and EPMA images of an electron microscopy. As to the points, the quantitative analysis was performed based on at least 30 points each to obtain its average composition taken as the mass concentration. The mass concentrations of R1 and Ce in the core portion were set as $\alpha R1$ and $\alpha Ce$ respectively, and the mass concentrations of R1 and Ce in the shell portion of the crystal grains were set as $\beta R1$ and $\beta Ce$ respectively. The mass concentration ratio of R1 to Ce in the shell portion that is $\beta R1/\beta Ce$ was set as B, and the mass concentration ratio of R1 to Ce in the core portion that is $\alpha R1/\alpha Ce$ was set as A. The measured $\alpha R1$, $\alpha Ce$, $\beta R1$, $\beta Ce$ and calculated A, B and B/A were shown in Table 1.

Compared to the samples obtained with a firing time of an hour, in the samples obtained with longer firing time, the ratio of R1 in the shell portion was larger than that of R1 in the core portion regardless of the ratio of R1:Ce in the raw material composition. The reason was considered to be the interdiffusion between Ce in the major phase grains and Nd as the R1 of the grain boundary caused by the development of heating treatment. If Example 5, Comparative Example 2, Examples 6 and 7 with the same raw material composition were compared, there was little difference between the ratio of R1 in the shell portion and that of R1 in the core portion when the firing time is an hour in Comparative Example 2, and B/A became larger when the firing time got longer. Thus, it could be said that interdiffusion developed and B/A became larger if prolonging the time in heating treatment based on such results.

By Comparing Comparative Example 3 in which firing time is 1 hour, Comparative Example 4 and Comparative Example 2, it was found that coercivity reduced if the ratio of Ce increased, but coercivity was found with little deterioration in the examples wherein the firing time was set to 8 hours and 48 hours, and the ratio of Ce in the core portion and the shell portion was set appropriately. However, the decrease of coercivity was significant in the compositions with a significantly large quantity of Ce. Further, in the samples fired for 48 hours with R1:Ce=100:0, the coercivity decreased compared to the samples fired for less time, which was considered due to the abnormal growth of the crystal grains. Thus, the composition on the surface of the grains was closer to R1-Fe—B than to (R1·Ce)—Fe—B assumed from the raw material composition.

There found no large difference of A/B values when comparing Example 5 in which the ratio of R1 to Ce was 50:50 and Nd was used as R1, and Examples 9 and 10 in which Pr and Dy were added as R1. The coercivity in Example 11 was high because Dy with high anisotropy was added.

The coercivity inducement mechanisms of the R-T-B based sintered magnet were considered as nucleation type, and coercivity was controlled by the composition on the surface of the grains. Therefore, it was considered that the higher coercivity which is closer to that of R1-Fe—B and larger than that assumed according to the raw material composition was achieved.

As shown in Table 1, regardless of firing time, adhesion strength with plated film was improved if the concentration of Ce was increased. The reason was though to be the better chemical adhesion between Ce and plated film than that between Nd and the plated film. In order to enhance the adhesion strength, Ce is preferably added.

TABLE 1

|  | Species of R1 | Ratio of R1 to Ce | Firing time (hr) | Core Portion |  |  | Shell portion |  |  |  | HcJ (kOe) | Adhesion Strength (N/m) |
|---|---|---|---|---|---|---|---|---|---|---|---|---|
|  |  |  |  | $\alpha R1$ | $\alpha Ce$ | $A = \alpha R1/\alpha Ce$ | $\beta R1$ | $\beta Ce$ | $B = \beta R1/\beta Ce$ | B/A |  |  |
| Example 1 | Nd | 90:10 | 8 | 23.71 | 2.64 | 8.98 | 29.81 | 1.76 | 16.94 | 1.89 | 13.1 | 121 |
| Example 2 | Nd | 80:20 | 8 | 21.35 | 5.29 | 4.04 | 24.33 | 3.36 | 7.24 | 1.79 | 12.6 | 137 |
| Example 3 | Nd | 70:30 | 8 | 18.85 | 7.66 | 2.46 | 21.01 | 4.31 | 4.87 | 1.98 | 12.5 | 150 |
| Example 4 | Nd | 60:40 | 8 | 16.04 | 10.26 | 1.56 | 18.26 | 8.09 | 2.26 | 1.44 | 12.2 | 166 |
| Example 5 | Nd | 50:50 | 8 | 13.31 | 13.21 | 1.01 | 18.01 | 11.98 | 1.50 | 1.49 | 11.8 | 187 |
| Example 6 | Nd | 50:50 | 24 | 13.40 | 13.31 | 1.01 | 17.71 | 11.98 | 1.48 | 1.47 | 11.8 | 189 |
| Example 7 | Nd | 50:50 | 48 | 13.44 | 13.36 | 1.01 | 17.69 | 12.03 | 1.47 | 1.46 | 11.9 | 180 |
| Example 8 | Nd | 10:90 | 8 | 2.66 | 20.66 | 0.13 | 2.96 | 20.41 | 0.15 | 1.13 | 8.8 | 223 |
| Example 9 | Nd | 70:30 | 48 | 18.66 | 7.75 | 2.41 | 21.75 | 5.51 | 3.95 | 1.64 | 12.7 | 133 |
| Example 10 | Nd, Pr | 50:50 | 8 | 13.33 | 13.19 | 1.01 | 17.77 | 11.76 | 1.51 | 1.50 | 12.0 | 175 |
| Example 11 | Nd, Dy | 50:50 | 8 | 13.52 | 13.27 | 1.02 | 18.23 | 12.44 | 1.47 | 1.44 | 16.4 | 170 |
| Comparative Example 1 | Nd | 100:0 | 8 | 26.78 | — | — | 26.66 | — | — | — | 13.2 | 98 |
| Comparative Example 2 | Nd | 50:50 | 1 | 13.35 | 12.98 | 1.03 | 14.23 | 12.77 | 1.11 | 1.08 | 6.4 | 183 |
| Comparative Example 3 | Nd | 100:0 | 1 | 26.72 | — | — | 26.81 | — | — | — | 12.9 | 95 |
| Comparative Example 4 | Nd | 70:30 | 1 | 18.34 | 7.76 | 2.36 | 18.6 | 7.64 | 2.43 | 1.03 | 7.8 | 148 |
| Comparative Example 5 | Nd | 100:0 | 48 | 26.81 | — | — | 26.76 | — | — | — | 9.8 | 92 |

What is claimed is:

1. A R-T-B based sintered magnet, comprising:

major phase grains having core portion and shell portion that covers the core, when the mass concentration of R1 and Ce in said core portion is set as $\alpha R1$ and $\alpha Ce$ respectively, and the mass concentration of R1 and Ce in said shell portion is set as $\beta R1$ and $\beta Ce$ respectively, the ratio (B/A) between the mass concentration ratio of R1 to Ce in said shell portion ($\beta R1/\beta Ce=B$) and that of R1 to Ce in said core portion ($\alpha R1/\alpha Ce=A$) is 1.10 or more, wherein, R includes Ce and R1, R1 comprises Nd and optionally at least one other rare earth element except Ce, and T is at least one transition metal element including Fe or the combination of Fe and Co, and the content ratio of R1 and Ce in the rare earth element R is 50:50-90:10.

2. The R-T-B based sintered magnet according to claim 1, wherein B/A is 1.4 or more.

3. The R-T-B based sintered magnet according to claim 1, wherein R1 additionally includes at least one selected from the group consisting of Pr, Dy, Ho and Tb.

4. The R-T-B based sintered magnet according to claim 1, wherein a protection film is formed on a surface of the R-T-B based sintered magnet.

5. The R-T-B based sintered magnet according to claim 1, wherein R1 is Nd.

* * * * *